US010870299B2

(12) United States Patent
Masaki et al.

(10) Patent No.: US 10,870,299 B2
(45) Date of Patent: Dec. 22, 2020

(54) MOVABLE BODY RECIPROCATING MECHANISM, CLEANING MECHANISM, OPTICAL SCANNING DEVICE, AND IMAGE FORMING APPARATUS

(71) Applicant: KYOCERA Document Solutions Inc., Osaka (JP)

(72) Inventors: Akihiro Masaki, Osaka (JP); Kazuhisa Hirahara, Osaka (JP)

(73) Assignee: KYOCERA Document Solutions Inc.

( * ) Notice: Subject to any disclaimer, the term of this patent is extended or adjusted under 35 U.S.C. 154(b) by 175 days.

(21) Appl. No.: 16/301,581

(22) PCT Filed: Feb. 8, 2018

(86) PCT No.: PCT/JP2018/004294
§ 371 (c)(1),
(2) Date: Nov. 14, 2018

(87) PCT Pub. No.: WO2018/155200
PCT Pub. Date: Aug. 30, 2018

(65) Prior Publication Data
US 2019/0202221 A1    Jul. 4, 2019

(30) Foreign Application Priority Data
Feb. 24, 2017 (JP) .................. 2017-033959

(51) Int. Cl.
*B41J 29/17* (2006.01)
*G02B 26/10* (2006.01)
(Continued)

(52) U.S. Cl.
CPC ............. *B41J 29/17* (2013.01); *B41J 11/007* (2013.01); *B41J 29/02* (2013.01); *G02B 26/10* (2013.01);
(Continued)

(58) Field of Classification Search
CPC ......... B41J 11/007; B41J 29/17; G02B 26/10; G03G 15/04; G03G 21/16
See application file for complete search history.

(56) References Cited

U.S. PATENT DOCUMENTS 5,689,293 A * 11/1997 Hirano ................. B41J 2/16538
347/32
5,917,518 A * 6/1999 Ohashi ................... B41J 25/304
347/37
(Continued)

FOREIGN PATENT DOCUMENTS

JP        6-15813       1/1994
JP        2011-158566   8/2011
(Continued)

*Primary Examiner* — Matthew G Marini
*Assistant Examiner* — Marissa Ferguson-Samreth
(74) *Attorney, Agent, or Firm* — Gerald E. Hespos; Michael J. Porco; Matthew T. Hespos

(57) ABSTRACT

A moving body reciprocation mechanism has a rotation shaft and a moving body that engages with a spiral ridge part of the rotation shaft and reciprocates along an axial direction. The state of the moving body changes among: a first state in which the moving body moves in a first movement direction; a second state in which the moving body releases the engagement; and a third state in which the moving body reengages with the spiral ridge part and moves in a second movement direction. The rotation shaft has a planar part and a cylindrical protrusion part. A cylinder part of the moving body has: a first end part that fits onto the cylindrical protrusion part in the second state; and a second end part that radially faces an outer circumferential surface of the spiral ridge part in the second state.

6 Claims, 14 Drawing Sheets

(51) Int. Cl.
*B41J 11/00* (2006.01)
*G03G 21/16* (2006.01)
*G03G 15/04* (2006.01)
*G02B 27/00* (2006.01)
*B41J 29/02* (2006.01)
*G02B 26/12* (2006.01)

(52) U.S. Cl.
CPC ......... *G02B 27/0006* (2013.01); *G03G 15/04* (2013.01); *G03G 21/16* (2013.01); *G02B 26/12* (2013.01)

(56) References Cited

U.S. PATENT DOCUMENTS

2004/0076446 A1* 4/2004 Ziegelmuller ....... G03G 15/166
399/99
2013/0129377 A1* 5/2013 Satomura ........... G03G 21/1832
399/106
2015/0002914 A1* 1/2015 Takahashi .......... G03G 21/1666
358/484

FOREIGN PATENT DOCUMENTS

| JP | 2012-234012 | | 11/2012 | |
|---|---|---|---|---|
| JP | 2013-238871 | * | 11/2013 | ............. G03G 15/02 |
| JP | 2015-009390 | * | 1/2015 | ............. G03G 21/18 |
| JP | 2015-064600 | * | 4/2015 | ............. G03G 21/18 |
| JP | 2016-061989 | * | 4/2016 | |

* cited by examiner

MOVABLE BODY RECIPROCATING MECHANISM, CLEANING MECHANISM, OPTICAL SCANNING DEVICE, AND IMAGE FORMING APPARATUS

TECHNICAL FIELD

The present invention relates to a reciprocating mechanism for a movable body that reciprocates as a rotation shaft rotates, a cleaning mechanism in which the reciprocation mechanism is used, an optical scanning device provided with the cleaning mechanism, and an image forming apparatus provided with the optical scanning device.

BACKGROUND ART

An optical scanning device that generates scanning light includes: a scanning optical system that is constituted of a light source, a polygon mirror, a scanning lens, etc.; and a housing that houses the scanning optical system and protects the scanning optical system from dust. A predetermined scanning target object is irradiated with the scanning light, which passes through a window part that is provided to the housing and is made of transparent glass. The scanning target object is a photoreceptor drum in the case of an image forming apparatus, and an electrostatic latent image is formed on the circumferential surface of the photoreceptor drum through irradiation with the scanning light.

When the window part is polluted, the scanning light can no longer be emitted properly toward the scanning target object. Due to this, automatic cleaning of the window part is required. For this automatic cleaning, a movable body reciprocating mechanism is applied. The reciprocation mechanism reciprocates, along the window part, a moving body that holds a cleaning member. As movable body reciprocating mechanisms, those provided with: a rotation shaft provided with a spiral ridge part on the circumferential surface thereof; and a moving body including a cylindrical part through which the rotation shaft is inserted and which has an engaging part that engages with the spiral ridge part are known (for example, JP 2011-158566 A and JP 2012-234012 A). The rotation shaft is forwardly and reversely rotated, whereby the moving body reciprocates along the rotation shaft and the cleaning member held by the moving body cleans the window part.

The moving body moves toward one end side of the rotation shaft by the rotation shaft being forwardly rotated. Then, the engagement between the engaging part and the spiral ridge part is temporarily released, and the rotation shaft idly rotates. Following this, the engaging part and the spiral ridge part reengage by the rotation shaft being reversely rotated, and the moving body starts moving toward the other end side of the rotation shaft. However, there have been cases in which the reengagement is not performed properly and the moving body malfunctions. For example, there have been cases of failure in which the moving body becomes incapable of moving due to the engaging part and the spiral ridge part not reengaging (not returning to meshing state) and unfortunately stopping in contact state.

SUMMARY OF INVENTION

An aim of the present invention is to provide a movable body reciprocating mechanism capable of ensuring that a moving body reciprocates. Further, another aim of the present invention is to provide a cleaning mechanism in which the reciprocation mechanism is used, an optical scanning device provided with the cleaning mechanism, and also an image forming apparatus provided with the optical scanning device.

A movable body reciprocating mechanism according to one aspect of the present invention is provided with: a rotation shaft; a drive source that causes the rotation shaft to rotate; and a moving body. The rotation shaft has: a circumferential surface; and a spiral ridge part protruded on the circumferential surface and extending spirally in an axial direction, and is rotatable in a first rotation direction and a second rotation direction opposite to the first rotation direction. The moving body includes: a cylinder part through which the rotation shaft is inserted; and an engaging part protruded on an inner circumferential surface of the cylinder part and engaging with the spiral ridge part, and reciprocates along the axial direction in an engaged state in which the engaging part is engaged with the spiral ridge part as the rotation shaft rotates.

The state of the moving body changes among: a first state in which the moving body is in the engaged state and moves in a first movement direction as the rotation shaft rotates in the first rotation direction; a second state in which the moving body releases the engaged state after moving in the first movement direction; and a third state in which, as the rotation shaft rotates in the second rotation direction, the engaging part reengages with the spiral ridge part to form the engaged state and the moving body moves in a second movement direction opposite to the first movement direction. The rotation shaft has, successively disposed adjacent to an end part of the spiral ridge part at a side of the spiral ridge part in the first movement direction: a planar part composed of only the circumferential surface; and a cylindrical protrusion part that is protruded radially outward from the circumferential surface. The cylinder part of the moving body has: a first end part that is located at a side of the cylinder part in the first movement direction and fits onto the cylindrical protrusion part in the second state; and a second end part that is located at a side of the cylinder part in the second movement direction and radially faces an outer circumferential surface of the spiral ridge part in the second state.

A cleaning mechanism according to another aspect of the present invention includes: a cleaning member that cleans an object to be cleaned; and the above-described movable body reciprocating mechanism, wherein the rotation shaft is disposed along the object to be cleaned, and the moving body holds the cleaning member.

An optical scanning device according to yet another aspect of the present invention includes: a housing that has a window part; a scanning optical system that is disposed inside the housing and irradiates a predetermined scanning target object with scanning light through the window part; and the above-described cleaning mechanism, wherein the object to be cleaned is the window part.

An image forming apparatus according to yet another aspect of the present invention includes: an image carrier; and the above-described optical scanning device, the optical scanning device irradiating the image carrier with the scanning light based on image information.

DESCRIPTION OF EMBODIMENT

Overall Configuration of Image Forming Apparatus

Figure 1:
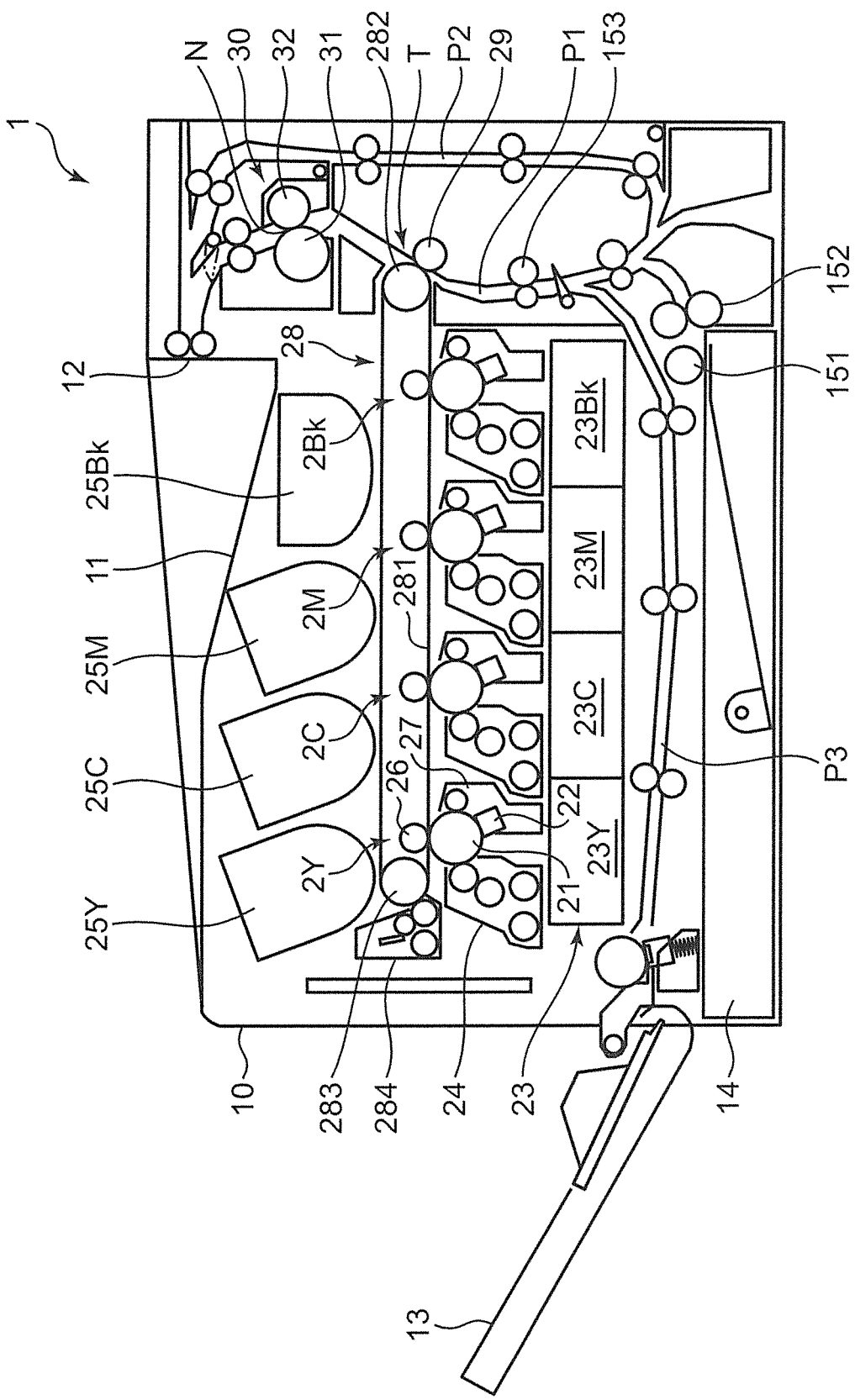
FIG. 1 is a schematic cross-sectional view illustrating an internal configuration of an image forming apparatus according to an embodiment of the present invention.

In the following, an embodiment of the present invention is described in detail on the basis of the drawings. FIG. 1 is a schematic cross-sectional view illustrating an internal configuration of an image forming apparatus 1 according to the embodiment of the present invention. Here, a color printer is illustrated as one example of the image forming apparatus 1. The image forming apparatus 1 also may be a monochromatic printer, a facsimile device, a multifunctional device, etc.

The image forming apparatus 1 includes a main body housing 10 that is composed of a housing having a substantially-cuboid shape, and the following units housed inside the main body housing 10: image forming units 2Y, 2C, 2M, 2Bk; an optical scanning unit 23; an intermediate transfer unit 28; and a fixing unit 30. A paper ejection tray 11 is provided in the top surface of the main body housing 10. A sheet ejection port 12 opens up facing the paper ejection tray 11. Further, a manual-feed tray 13 is provided in openable/closable state to a lateral wall of the main body housing 10. A sheet feeder cassette 14 that houses a sheet to undergo image forming processing is attached in detachable state to the bottom part of the main body housing 10.

The image forming units 2Y, 2C, 2M, 2Bk form toner images of the colors yellow, cyan, magenta, and black, based on image information transmitted from an external device such as a computer, and are disposed in tandem at a predetermined pitch in the horizontal direction. The image forming units 2Y, 2C, 2M, 2Bk each include: a photoreceptor drum 21 (an image carrier) that carries an electrostatic latent image and a toner image; a charger 22 that charges the circumferential surface of the photoreceptor drum 21; the optical scanning unit 23, which forms the electrostatic latent image on the circumferential surface of the photoreceptor drum 21; a developing device 24 that causes a developer to adhere onto the electrostatic latent image to form the toner image; toner containers 25Y, 25C, 25M, 25Bk of the colors yellow, cyan, magenta, and black that supply toners of the respective colors to the developing device 24; a primary transfer roller 26 that causes the toner image formed on the photoreceptor drum 21 to undergo primary transfer; and a cleaning device 27 that removes residual toner on the circumferential surface of the photoreceptor drum 21.

In the present embodiment, the optical scanning unit 23 includes optical scanning devices 23Y, 23C, 23M, 23Bk of the colors yellow, cyan, magenta, and black that are disposed in correspondence with the photoreceptor drums 21 of the respective colors. Each of the optical scanning devices 23Y to 23Bk includes a scanning optical system constituted of a laser light source, a polygon mirror, a scanning lens, etc., and irradiates the circumferential surface of the corresponding photoreceptor drum 21 with scanning light on the basis of the image information provided from the external device.

The intermediate transfer unit 28 causes the toner images formed on the photoreceptor drums 21 to undergo primary transfer. The intermediate transfer unit 28 includes: a transfer belt 281 that circulates while contacting the circumferential surfaces of the respective photoreceptor drums 21; and a driving roller 282 and a driven roller 283 across which the intermediate transfer belt 281 is suspended. The transfer belt 281 is pressed against the circumferential surfaces of the respective photoreceptor drums 21 by the primary transfer rollers 26. The toner images on the photoreceptor drums 21 of the respective colors are superimposed on one another at the same position on the transfer belt 281 to undergo primary transfer. Hence, a full-color toner image is formed on the transfer belt 281.

A secondary transfer roller 29 is disposed to face the driving roller 282. The secondary transfer roller 29 and the drive roller 282 form a secondary transfer nip part T with the transfer belt 281 therebetween. At the secondary transfer nip part T, the full color toner image on the transfer belt 281 undergoes secondary transfer onto a sheet. Toner remaining on the circumferential surface of the transfer belt 281 without being transferred onto the sheet is recovered by a belt cleaning device 284 disposed to face the driven roller 283.

The fixing unit 30 includes: a fixing roller 31 with a built-in heat source; and a pressurizing roller 32 that forms a fixing nip part N together with the fixing roller 31. The fixing unit 30 performs fixing processing, in which the sheet onto which the toner image has been transferred at the secondary transfer nip part T is heated and pressurized at the fixing nip part N to cause the toner to melt and adhere to the sheet. The sheet having undergone the fixing processing is ejected toward the paper ejection tray 11 from the sheet ejection port 12.

A sheet conveyance path for conveying sheets is provided inside the main body housing 10. The sheet conveyance path includes a main conveyance path P1 that extends in the top-bottom direction from near the bottom part of the main body housing 10 to near the top part of the main body housing 10 through the secondary transfer nip part T and the fixing unit 30. The downstream end of the main conveyance path P1 is connected to the sheet ejection port 12. A reversal conveyance path P2 that performs reversal conveyance of sheets upon both-side printing is disposed to extend from the most downstream end of the main conveyance path P1 to near the upstream end of the main conveyance path P1. Further, a sheet conveyance path P3 for manually-fed sheets that extends from the manual-feed tray 13 to the main conveyance path P1 is disposed above the sheet feeder cassette 14.

The sheet feeder cassette 14 is provided with a sheet housing part that houses a sheet stack. Near the upper right of the sheet feeder cassette 14, a pick-up roller 151 and a sheet-feeding roller pair 152 are provided. The pick-up roller 151 draws out sheets at the uppermost layer of the sheet stack one by one, and the sheet-feeding roller pair 152 sends out the sheets onto the upstream end of the main conveyance path P1. Sheets placed on the manual-feed tray 13 are also sent out onto the upstream end of the main conveyance path P1 through the sheet conveyance path P3 for manually-fed sheets. At a position along the main conveyance path P1 that is farther upstream than the secondary transfer nip part T is, a resist roller pair 153 that sends out sheets to the transfer nip part at predetermined timings is disposed.

When a sheet is subjected to single-side printing (image forming) processing, the sheet is sent out onto the main conveyance path P1 from the sheet feeder cassette 14 or the manual-feed tray 13, and the sheet undergoes transfer processing of a toner image at the secondary transfer nip part T and fixing processing at the fixing unit 30. In the fixing processing, the toner having been transferred onto the sheet is fixed to the sheet. Then, the sheet is ejected from the sheet ejection port 12 onto the paper ejection tray 11. Meanwhile, when a sheet is subjected to both-side printing processing, after the transfer processing and fixing processing have been performed on one side of the sheet, a part of the sheet is ejected onto the paper ejection tray 11 from the sheet ejection port 12. Then, the sheet undergoes switchback conveyance and travels through the reversal conveyance path P2 to be returned to near the upstream end of the main conveyance path P1. Thereafter, the transfer processing and fixing processing are performed on the other side of the sheet, and the sheet is ejected onto the paper ejection tray 11 from the sheet ejection port 12.

Overview of Optical

Figure 2:
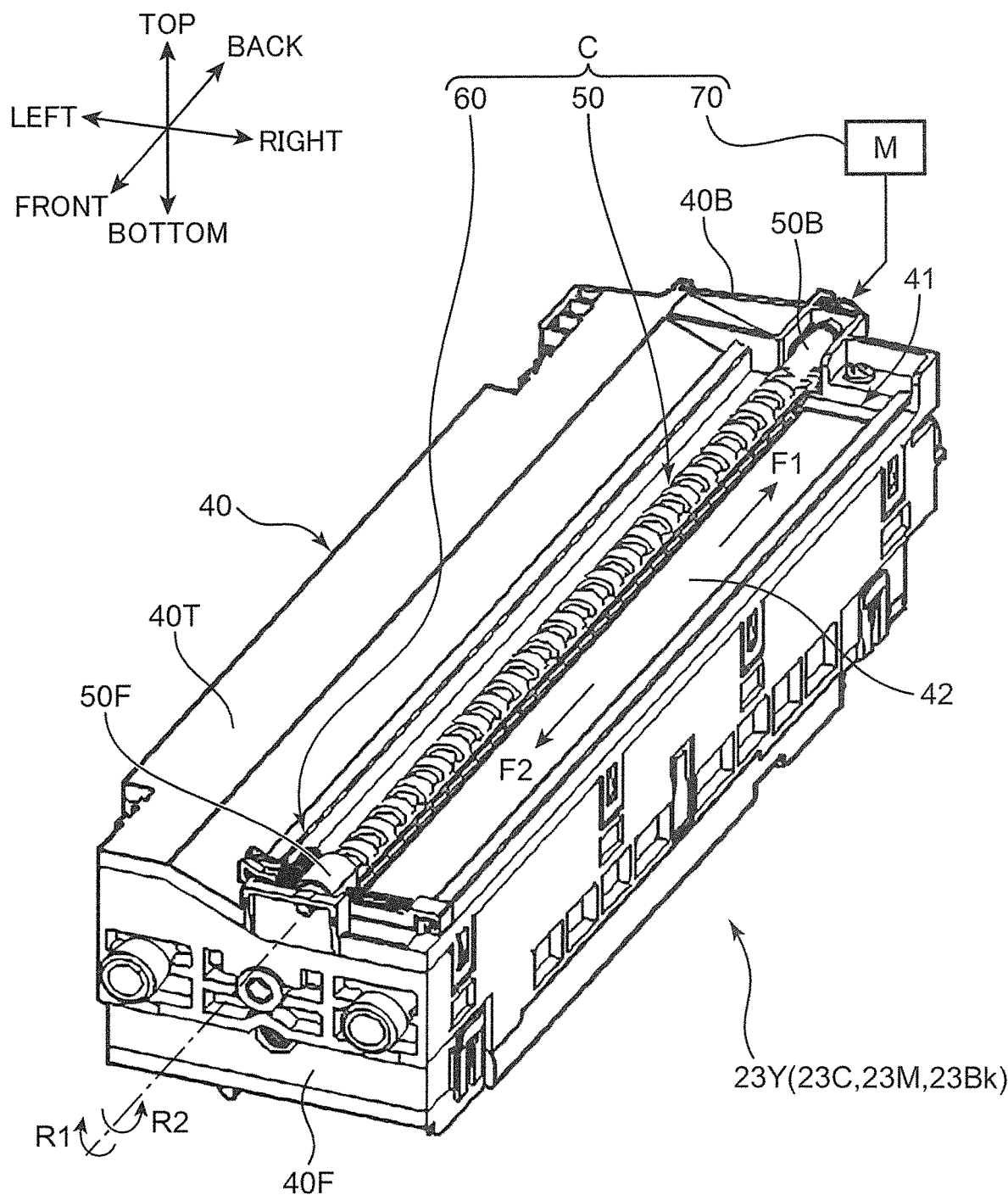
FIG. 2 is a perspective view illustrating an optical scanning device according to the embodiment of the present invention.

Scanning Device with Cleaning Mechanism] FIG. 2 is a perspective view illustrating the optical scanning device 23Y for the color yellow (the optical scanning devices 23C, 23M, 23Bk for the rest of the colors are also the same). In FIG. 2 and the following drawings, indications are provided of the front and back, left and right, and top and bottom directions. These directional indications are provided for the convenience of description and do not limit directions in the real device.

The optical scanning device 23Y includes a housing 40 that has a substantially-cuboid shape elongated in the front-back direction. The housing 40 houses the above-described scanning optical system (not illustrated in the drawings) constituted of the laser light source, the polygon mirror, the scanning lens, etc., and protects the scanning optical system from dust. At the right end-side of a top wall 40T of the housing 40, a window part 41 (object to be cleaned) extending in the front-back direction is disposed. The window part 41 has a piece of glass 42 fitted therein. The piece of glass 42 has a rectangular shape elongated in the front-back direction, and has a characteristic of not blocking the advance of scanning light (has transparency). Scanning light generated by the scanning optical system is taken out to the outside of the housing 40 through the piece of glass 42 and is emitted toward the photoreceptor drum 21.

The top wall 40T of the housing 40 has a cleaning mechanism C (a movable body reciprocating mechanism) assembled thereto. The cleaning mechanism C cleans the top surface of the piece of glass 42 of the window part 41, and includes: a rotation shaft 50; a cleaning unit 60 (a moving body); and a drive motor 70 (a drive source).

The rotation shaft 50 reciprocates the cleaning unit 60 in the back direction F1 (a first movement direction) and the front direction F2 (a second movement direction), and is disposed in parallel with the window part 41 to extend along the left side of the window part 41 (the piece of glass 42). The piece of glass 42 has a front-back length covering substantially the entire length between a front wall 40F and a back wall 40B of the housing 40, and the rotation shaft 50 also has a front-back length from the front wall 40F to the back wall 40B. The rotation shaft 50 is supported by the housing 40 to be rotatable in a clockwise direction R1 (a first rotation direction) and a counterclockwise direction R2 (a second rotation direction). Specifically, a front end part 50F and a back end part 50B of the rotation shaft 50 are axially-supported by the front wall 40F and the back wall 40B of the housing 40, respectively. The drive motor 70 is a motor that is capable of rotating in the forward and reverse directions, and generates rotational drive force for causing the rotation shaft 50 to rotate in the clockwise direction R1 or the counterclockwise direction R2.

The cleaning unit 60 reciprocates along the axial direction of the rotation shaft 50 (the front-back direction) as the rotation shaft 50 is rotationally driven by the drive motor 70. The cleaning unit 60 holds a cleaning member 6 (refer to FIGS. 6 and 8) that wipes off dirt on the top surface of the piece of glass 42 by coming in slide contact with the top surface. Here, suppose that the cleaning unit 60 moves in the back direction F1 by the rotation shaft 50 being rotationally driven in the clockwise direction R1 and the cleaning unit 60 moves in the front direction F2 by the rotation shaft 50 being rotationally driven in the counterclockwise direction R2.

FIG. 2 illustrates a state in which the cleaning unit 60 is located close to the front wall 40F. The above-described reciprocation refers to a movement in which the cleaning unit 60 moves in the back direction F1 from a position adjacent to the front wall 40F to a position adjacent to the back wall 40B and then moves from the position adjacent to the back wall 40B back to the position adjacent to the front wall 40F. That is, the state of the cleaning unit 60 changes among: a state in which the cleaning unit 60 moves in the back direction F1 as the rotation shaft 50 rotates in the clockwise direction R1 (a first state); a state in which engagement with the rotation shaft 50 is released and the cleaning unit 60 stays near the back wall 40B (a second state); a state in which the cleaning unit 60 moves in the front direction F2 as the rotation shaft 50 rotates in the counterclockwise direction R2 (a third state); and a state in which the engagement with the rotation shaft 50 is released once again and the cleaning unit 60 stays near the front wall 40F. By such reciprocation of the cleaning unit 60, the top surface of the piece of glass 42 is wiped a plurality of times by the cleaning member 6.

Details of Parts of Cleaning Mechanism

Figure 3:
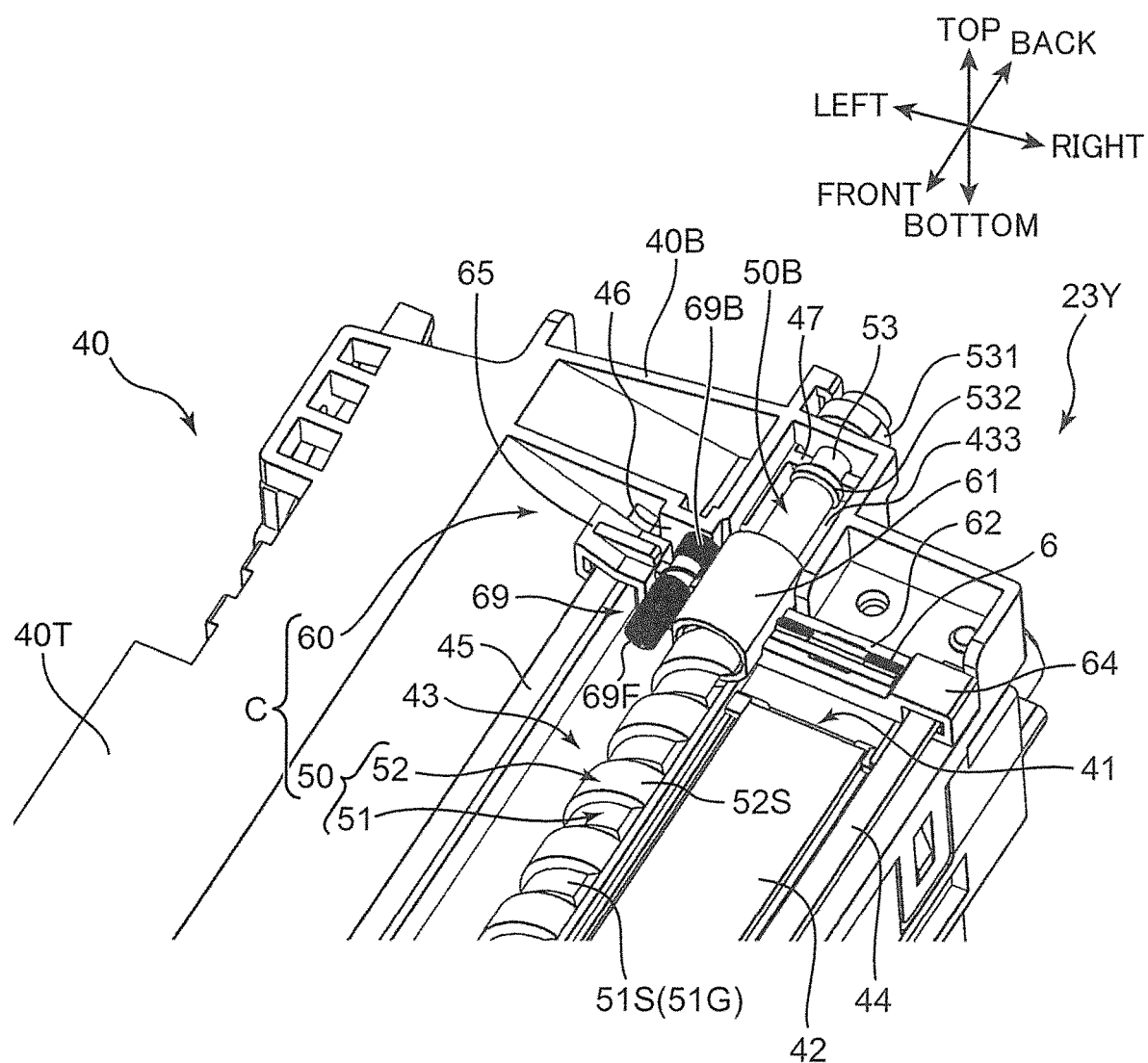
FIG. 3 is a partial perspective view of a vicinity of a back end of a top wall of the optical scanning device, and is a diagram illustrating a state in which a rotation shaft and a cleaning unit (a moving body) have been assembled onto a housing of the optical scanning device.
Figure 4:
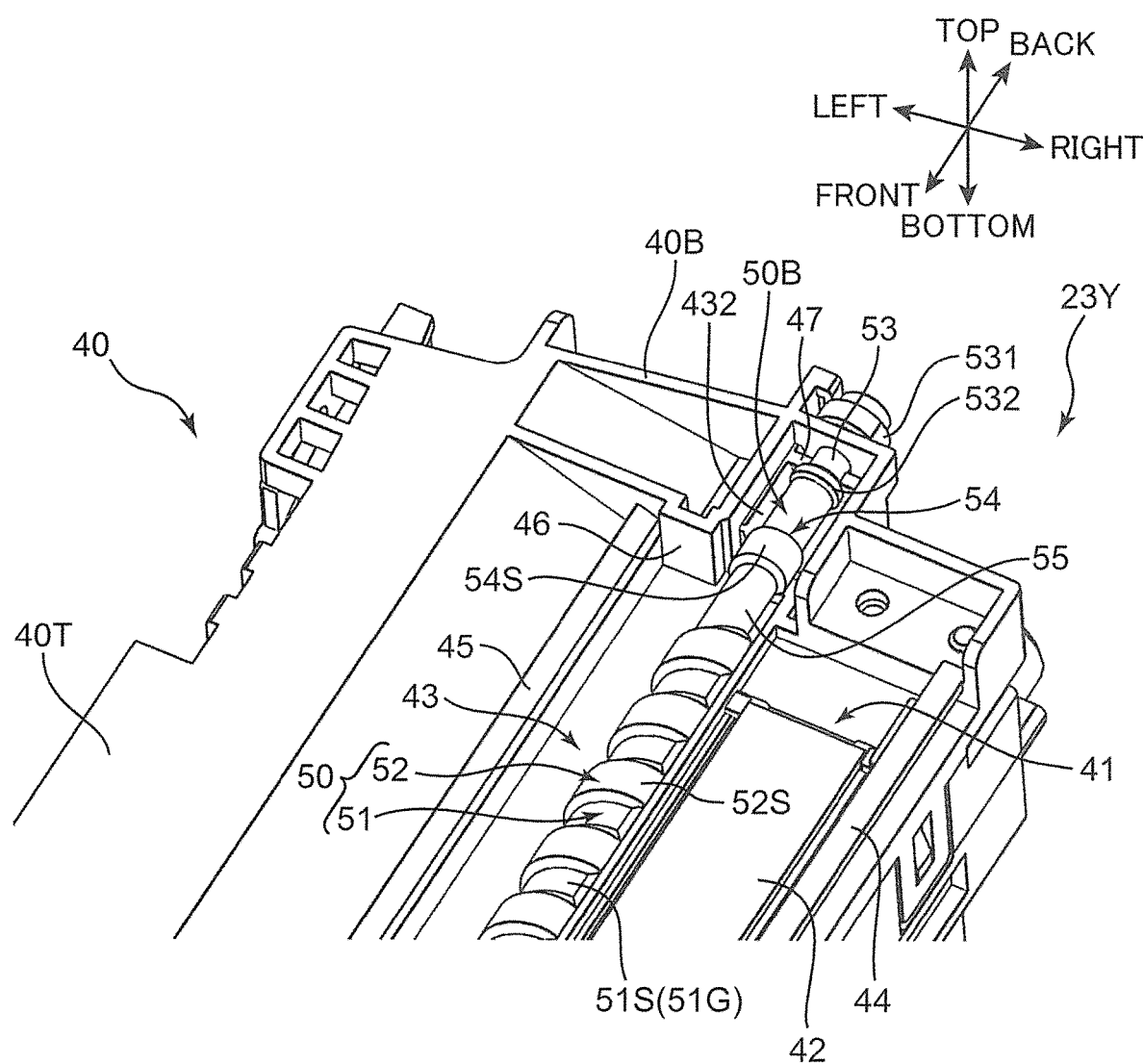
FIG. 4 is a partial perspective view of a state in which the cleaning unit has been removed from FIG. 3.
Figure 5:
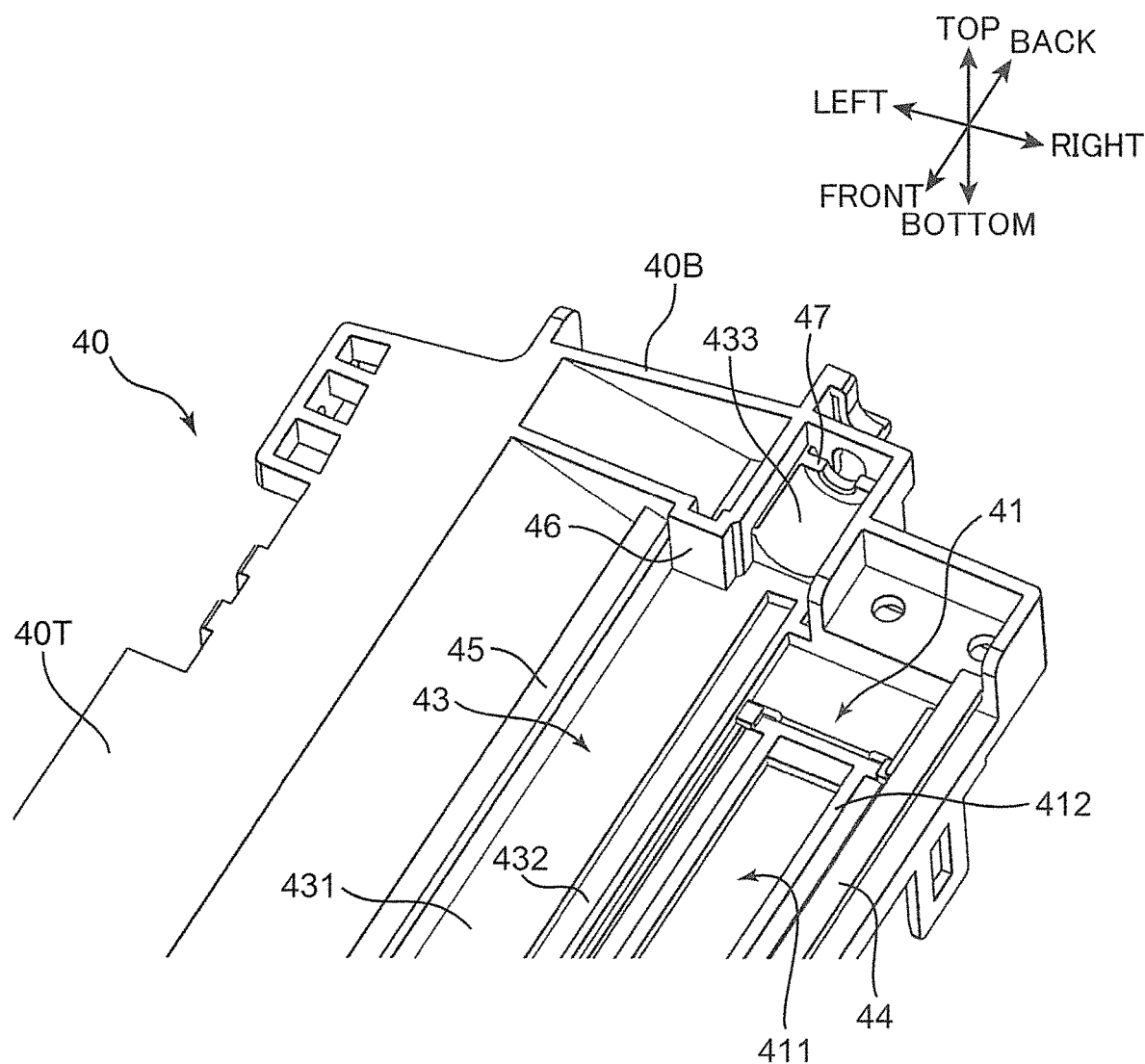
FIG. 5 is a partial perspective view of a state in which the rotation shaft has been removed from FIG. 4.
Figure 6:
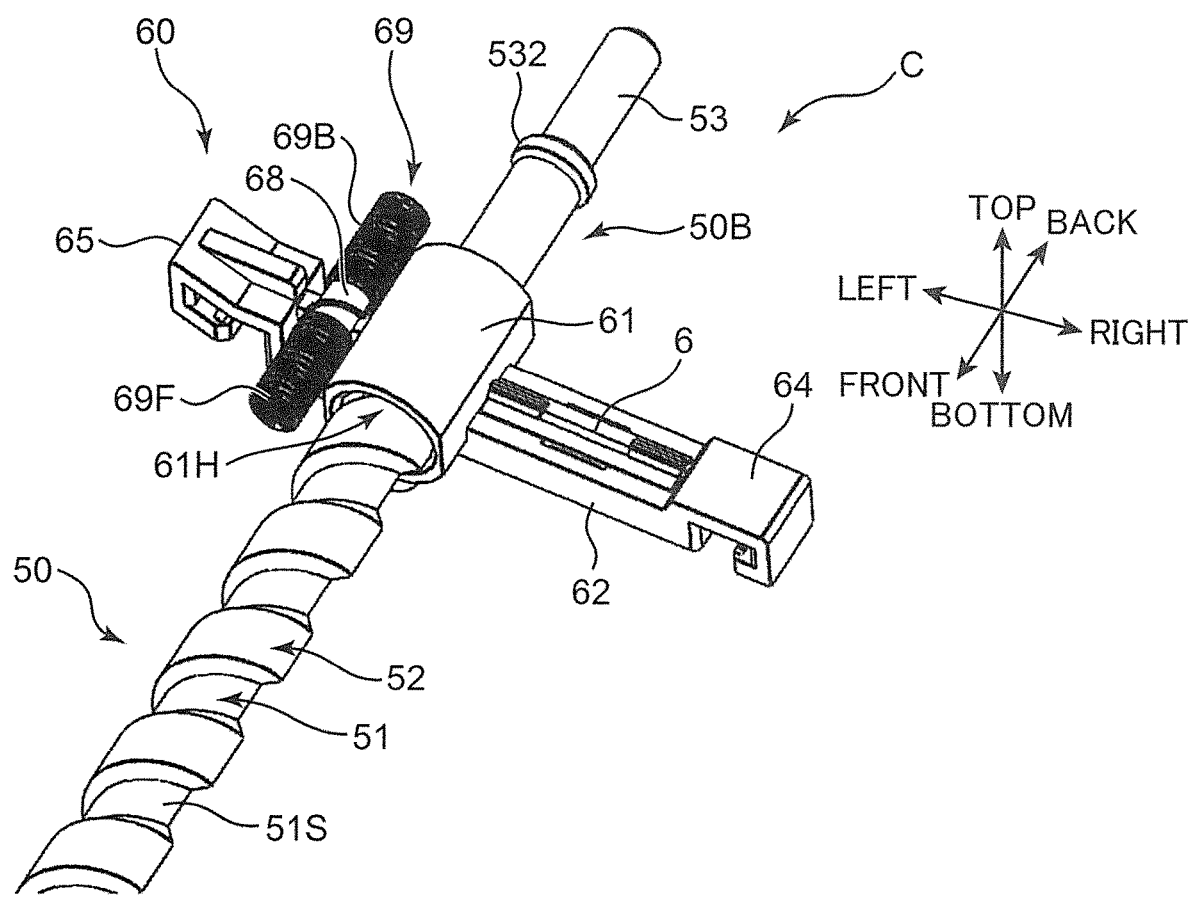
FIG. 6 is a perspective view of the cleaning unit and a part of the rotation shaft.
Figure 7:
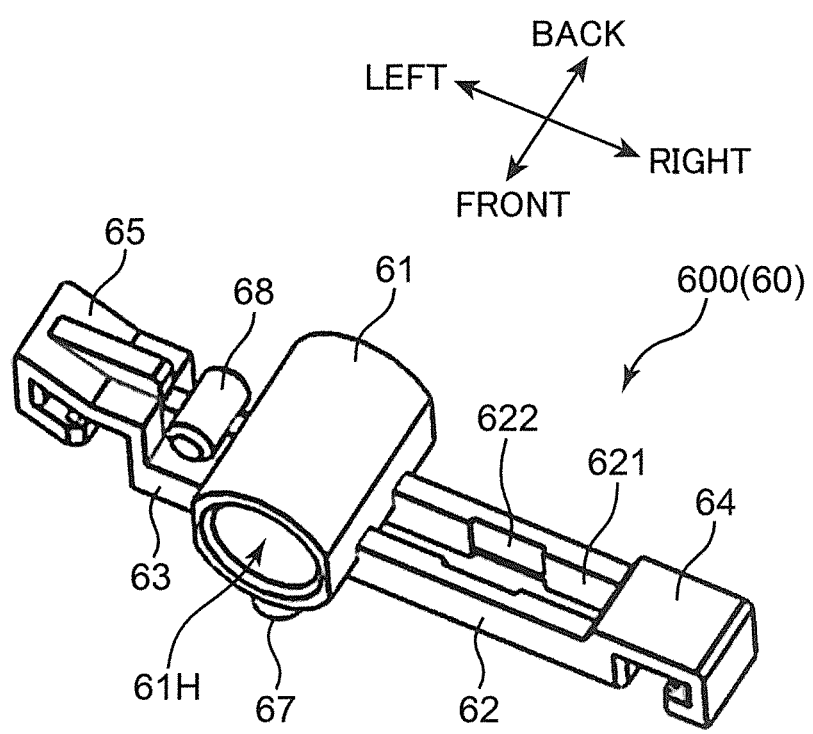
FIG. 7 is a perspective view of the cleaning unit seen from above.
Figure 8:
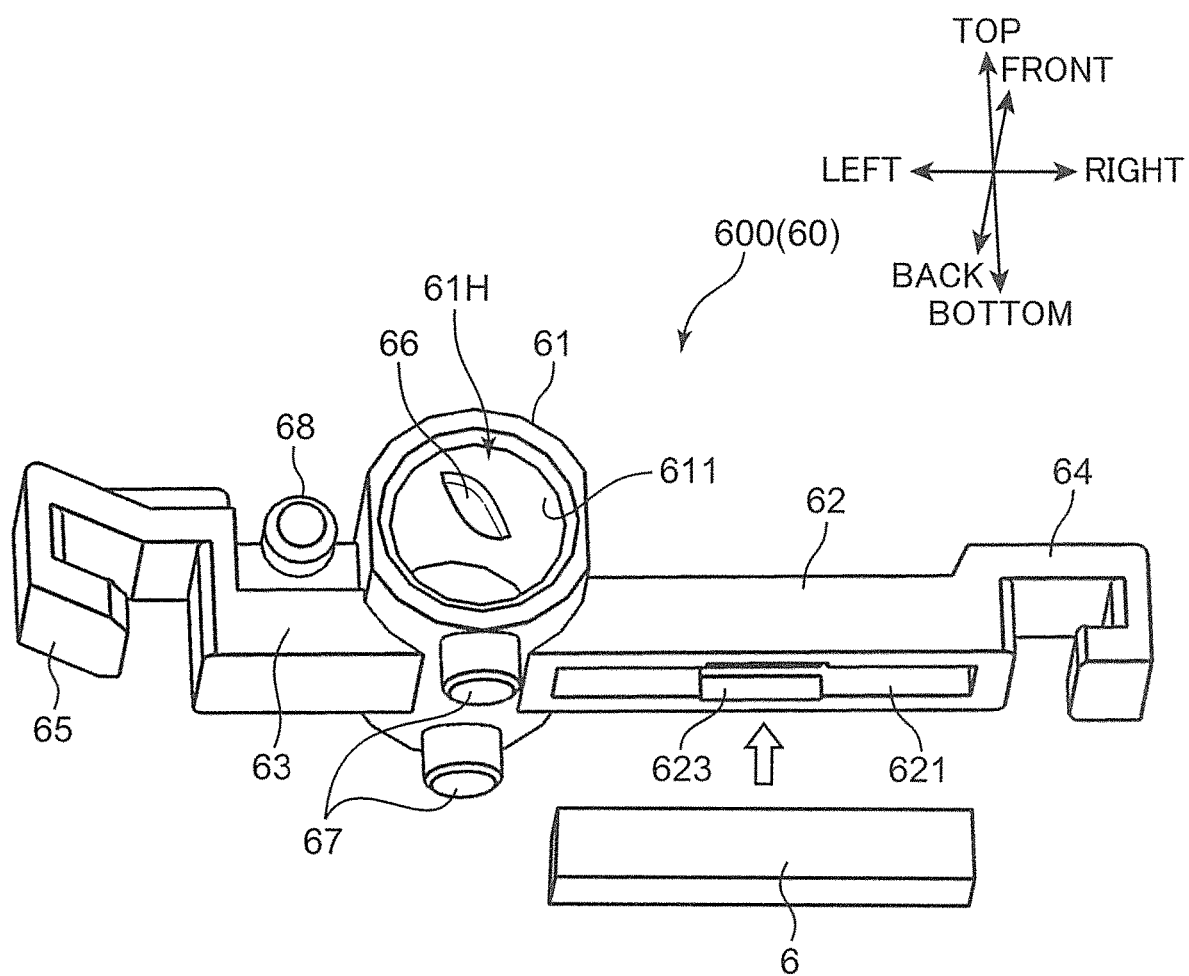
FIG. 8 is a perspective view of the cleaning unit seen from below.

FIG. 3 is a partial perspective view of the vicinity of the back end of the housing 40 of the optical scanning device 23Y, in a state in which the cleaning mechanism C is assembled onto the housing 40. FIG. 4 illustrates a state in which the cleaning unit 60 has been removed from FIG. 3, and FIG. 5 further illustrates a state in which the rotation shaft 50 has been removed from FIG. 4. FIG. 5 illustrates the top wall 40T of the housing 40, in a state in which the cleaning mechanism C has been removed. FIG. 6 is a perspective view of the cleaning unit 60 and the vicinity of the back end part 50B of the rotation shaft 50. FIGS. 7 and 8 are perspective views of the cleaning unit 60 (a moving frame 600) seen from above and below, respectively.

Top Wall of Housing

Referring mainly to FIG. 5, the top wall 40T of the housing 40 is provided with: a shaft housing part 43; a right rail 44; a left rail 45; a spring receiving wall 46; and a bearing part 47, in addition to the above-described window part 41. The window part 41 includes: an opening part 411 that penetrates the top wall 40T in the top-bottom direction; and a frame part 412 that is disposed at the peripheral edge of the opening part 411. The opening part 411 is a rectangular opening that is elongated in the front-back direction, and is an opening that serves as an optical path of the scanning light. The frame part 412 is a portion that receives the bottom surface of the piece of glass 42, and also serves as a seal. The piece of glass 42 is placed on the frame part 412 so that the opening part 411 is closed from above by the piece of glass 42.

The shaft housing part 43 is a recess groove extending in the front-back direction for housing the rotation shaft 50 and a part of the cleaning unit 60. A bottom surface 431 of the shaft housing part 43 is level, but the bottom surface 431 has formed therein, near the right end thereof, a guide groove 432 that is composed of a narrow recess groove extending in the front-back direction. The guide groove 432 is provided to guide the reciprocation of the cleaning unit 60. At the back end of the shaft housing part 43, a shaft end receiving part 433 provided with a semi-columnar cavity is continuously disposed.

The right rail 44 and the left rail 45 are also provided for guiding the reciprocation of the cleaning unit 60. The right rail 44 extends in the front-back direction near the right end of the top wall 40T. The left rail 45 extends in the front-back direction near the left-right direction center of the top wall 40T, and is disposed parallelly with respect to the right rail 44 with the window part 41 and the shaft housing part 43 therebetween.

The spring receiving wall 46 is a wall with which a later-described spring 69 provided to the cleaning unit 60 is brought in contact. The spring receiving wall 46 is a vertical wall that stands vertically upward from the bottom surface 431 at the back end of the shaft housing part 43. The bearing part 47 is disposed further toward the back side than the shaft end receiving part 433 is, and is a portion that axially supports the rotation shaft 50. Note that, although not illustrated in FIG. 5 due to FIG. 5 illustrating the vicinity of the back end of the top wall 40T, the spring receiving wall 46 and the bearing part 47 are also provided in the vicinity of the front end of the top wall 40T.

Rotation Shaft

Referring mainly to FIG. 4, the rotation shaft 50 is a shaft body that extends linearly in the front-back direction. The rotation shaft 50 is provided with: a shaft 51 provided with a circumferential surface 51S; and a spiral 52 (a spiral ridge part) protruded radially outward from the circumferential surface 51S of the shaft 51. The shaft 51 is a columnar shaft having a predetermined outer diameter, and has a front-back length from the front wall 40F to the back wall 40B of the housing 40. The circumferential surface 51S is a columnar circumferential surface.

The spiral 52 is a ridge part that extends spirally in the axial direction of the shaft 51 with a predetermined spiral pitch. The spiral 52 is protruded on the shaft 51 within an area of the rotation shaft 50 excluding the front end part 50F and the back end part 50B. The most radially-protruding top surface (a top surface 52S) of the spiral 52 is configured as a substantially planar surface. That is, the top surface 52S, which is planar and has a belt-like shape, is formed spirally around the circumferential surface 51S of the shaft 51. Between the spiral pitches of the spiral 52, the circumferential surface 51S of the shaft 51 is exposed. In other words, a spiral recess groove 51G formed of the circumferential surface 51S and a pair of standing lateral walls of the spiral 52 at both sides of the circumferential surface 51S extends in the axial direction of the rotation shaft 50.

At the back end part 50B, the rotation shaft 50 (the shaft 51) is provided with: a shaft end part 53; a column part 54 (a cylindrical protrusion part); and a planar part 55. The shaft end part 53 is a shaft portion that coaxially connects to the back end of the shaft 51, and has slightly smaller outer diameter than the shaft 51 and is axially supported by the bearing part 47. The shaft end part 53 has an input gear 531 attached thereto at the back end thereof. The input gear 531 is meshed with a drive gear to which drive force of the drive motor 70 is provided, and the rotation shaft 50 is rotated about the axis thereof by the drive force. The shaft end part 53 has a stopper ring 532 protruded at the front end-side thereof. The stopper ring 532 is a portion having greater diameter than the shaft end part 53. The stopper ring 532 and the wall surface of the bearing part 47 mutually interfere, whereby a measure is taken to prevent the rotation shaft 50 from falling out from the shaft housing part 43.

The column part 54 is protruded radially outward from the circumferential surface 51S at a predetermined position (described in detail later) of the back end of the shaft 51. The column part 54 has a planar column circumferential surface 54S at the farthest-protruding outer circumferential portion thereof. In the present embodiment, the radially-direction protrusion height of the spiral 52 from the circumferential surface 51S and the radial-direction protrusion height of the column part 54 from the circumferential surface 51S are set the same. That is, the top surface 52S of the spiral 52 and the column circumferential surface 54S of the column part 54 are located at the same radial-direction height position. Note that the height positions of the top surface 52S and the column circumferential surface 54S do not need to match in a strict sense, and there may be a slight difference between the height positions.

The planar part 55 is a portion which is disposed at the back end of the shaft 51 and at which the spiral 52 is not present. That is, the planar part 55 is a planar columnar area composed of only the circumferential surface 51S. Here, the expression "composed of only the circumferential surface 51S" means that a portion engaging with a later-described engaging part 66 provided to the cleaning unit 60 is not present on the circumferential surface 51S, while small protrusions, etc., of a size not forming such engagement may be present at the planar part 55. The planar part 55 is located between the column part 54 and the back end part (the end part in the first movement direction) of the spiral 52. That is, the planar part 55 and the column part 54 are successively disposed adjacent to the back end part of the spiral 52.

Cleaning Unit

With reference to FIG. 3 and FIGS. 6 to 8, the cleaning unit 60 includes: a moving frame 600, the cleaning member 6; and a spring 69 (a biasing member). The moving frame 600 is provided with the following integrally-formed parts: a cylinder part 61; a right arm 62; a left arm 63; a right guide part 64; a left guide part 65; an engaging part 66; columnar protrusions 67; and a spring holding part 68. The cleaning member 6 is supported by the right arm 62, and the spring 69 is held by the spring holding part 68.

The cleaning unit 60 is provided with a shape such that the cylinder axis of the cylinder part 61 is oriented along the front-back direction, and the right arm 62 and the left arm 63 respectively extend to the right and the left in the horizontal direction from the outer circumferential surface of the cylinder part 61. The right guide part 64 and the left guide part 65 are respectively disposed at the right end of the right arm 62 and the left end of the left arm 63. The engaging part 66 and the columnar protrusions 67 are attached to the cylinder part 61, and the spring holding part 68 is disposed next to the cylinder part 61 at the left of the cylinder part 61.

The cylinder part 61 is a circular tubular body having a predetermined length in the front-back direction, and has an insertion hole 61H through which the rotation shaft 50 is inserted. The inner diameter of the insertion hole 61H is set to be slightly greater than the outer diameter of the top surface 52S of the spiral 52. The engaging part 66 protrudes radially inward from an inner circumferential surface 611 of the cylinder part 61 (FIG. 8). The engaging part 66 can engage with the spiral 52 in a state in which the rotation shaft 50 is inserted through the cylinder part 61. Further, when the rotation shaft 50 is forwardly and reversely rotated in an engaged state in which the engaging part 66 is engaged with the spiral 52, the moving frame 600 (the cleaning unit 60) reciprocates in the axial direction. That is, the engaging part 66 fits into the spiral recess groove 51G, and receives, from the spiral 52, propulsive force for moving in the axial direction when the rotation shaft 50 rotates about the axis thereof. Due to this propulsive force, the cleaning unit 60 moves in the back direction F1 or the front direction F2.

The right arm 62 is disposed at a position facing the window part 41 of the housing 40 in the top-bottom direction, and has a left-right direction length spanning the window part 41. In order to hold the cleaning member 6, the right arm 62 is provided with a slit 621 penetrating through the right arm 62 in the top-bottom direction. The slit 621 is a slit having a rectangular cross-sectional shape elongated in the left-right direction and having a size allowing the cleaning member 6 to be inserted therethrough. At the center part of the slit 621 in the left-right direction, locking parts 622 for fixing the cleaning member 6 are provided. The cleaning member 6 has a rectangular strip-like shape, and for example, a member constituted of sponge or non-woven fabric can be used as the cleaning member 6.

The left arm 63 is disposed at a position facing the shaft housing part 43 of the housing 40 in the top-bottom direction. The left-right direction width of the bottom surface of the left arm 63 is substantially equal to the left-right direction width of the bottom surface 431 excluding the guide groove 432. The spring holding part 68 is disposed on the top surface of the left arm 63. The spring holding part 68 is a small columnar body that extends in the front-back direction.

The spring 69 is a coil spring that is longer in the front-back direction than the spring holding part 68, and is attached to the spring holding unit 68 in a state in which the center part of the spring 69 in the coil extension direction is expanded (FIG. 6). The portion of the spring 69 that protrudes from the front end of the spring holding part 68 is defined as a spring front end part 69F, and the portion of the spring 69 that protrudes from the back end of the spring holding part 68 is defined as a spring back end part 69B. The front end edge of the spring front end part 69F protrudes further toward the front than the front end edge of the cylinder part 61 does, and the back end edge of the spring back end part 69B protrudes further toward the back than the back end edge of the cylinder part 61 does.

The right guide part 64 is a hook-shaped portion that is disposed continuous to the right end of the right arm 62. The right guide part 64 is fitted onto the right rail 44 of the housing 40 and slides in the front-back direction by being guided by the right rail 44. The left guide part 65 is a hook-shaped portion that is disposed continuous to the left end of the left arm 63. The left guide part 65 is fitted onto the left rail 45 and slides in the front-back direction by being guided by the left rail 45. The columnar protrusions 67 are protrusions forming a pair that are protruded downward from the bottom surface of the cylinder part 61. The columnar protrusions 67 are fitted into the guide groove 432, which is recessed in the bottom surface 431 of the shaft housing part 43, and slides in the front-back direction by being guided by the guide groove 432.

The cleaning unit 60 is assembled onto the top wall 40T of the housing 40 (FIG. 3) in a state in which the moving frame 600 is equipped with the cleaning member 6 and the spring 69 and in which the cylinder part 61 has the rotation shaft 50 inserted therethrough (FIG. 6). In detail, the right guide part 64 and the left guide part 65 are respectively fitted onto the right rail 44 and the left rail 45, and the cylinder part 61 and the left arm 63 are housed inside the shaft housing part 43 of the top wall 40T. By assembly being performed in such a manner, a part of the cleaning member 6, which is held by the right arm 62, is put in surface contact with the top surface of the piece of glass 42, the bottom surface of the left arm 63 faces the bottom surface 431, and the columnar protrusions 67 fit into the guide groove 432.

Reciprocation Operation of Cleaning Unit

The home position of the cleaning unit 60 is a position close to the front wall 40F of the housing 40, as illustrated in FIG. 2. That is, the home position is the position of the front end part 50F of the rotation shaft 50. When the rotation shaft 50 is rotated in the clockwise direction R1 (the first rotation direction) in a state in which the cleaning unit 60 is located at the home position, the cleaning unit 60 starts to move in the back direction F1 due to the engagement between the spiral 52 of the rotation shaft 50 and the engaging part 66 of the cleaning unit 60. While the spiral 52 is not formed on the shaft 51 at the front end part 50F, the spiral 52 and the engaging part 66 are capable of engaging with one another because the moving frame 600 is biased in the back direction F1 by the biasing force of the spring front end part 69F.

The cleaning unit 60 continues to move in the back direction F1 (the first movement direction) as the rotation of the rotation shaft 50 in the clockwise direction R1 continues (the first state). The cleaning unit 60 eventually reaches a position close to the back wall 40B (the back end part 50B of the rotation shaft 50). This concludes the first half of the movement of the cleaning unit 60. As already described above, the rotation shaft 50 has the planar part 55, at which the spiral 52 is not protruded, at the back end part 50B. Due to this, the engaged state of the spiral 52 and the engaging part 66 is released when the cleaning unit 60 reaches the planar part 55 (the second state). Accordingly, the rotation shaft 50 idly rotates even if the rotation shaft 50 is rotated in the clockwise direction R1 in this second state, because the propulsive force toward the back direction F1 is not provided to the cleaning unit 60. At this point, the spring back end part 69B of the spring 69 abuts against the spring receiving wall 46 and is put in compressed state.

Following the second state, the second half of the movement of the cleaning unit 60 is started. Specifically, the rotation shaft 50 is rotated in the counterclockwise direction R2 (the second rotation direction), the spiral 52 and the engaging part 66 reengage, and the cleaning unit 60 starts to move in the front direction F2. Here, the biasing force of the spring back end part 69B assists the reengagement of the spiral 52 and the engaging part 66. That is, when the cleaning unit 60 is in the second state, biasing force toward the front direction F2 is acting on the moving frame 600 due to the spring back end part 69B being in compressed state, and the engaging part 66 can be caused to reengage with the spiral 52 when the rotation shaft 50 is rotated in the counterclockwise direction R2.

The cleaning unit 60 continues to move in the front direction F2 (the second movement direction) as the rotation of the rotation shaft 50 in the counterclockwise direction R2 continues (the third state). The cleaning unit 60 eventually returns to the position close to the front wall 40F (the front end part 50F of the rotation shaft 50). This concludes the second half of the movement (reciprocation) of the cleaning unit 60. A configuration can also be made so that the above-described reciprocation is repeated multiple times.

Structure for Preventing Swinging of Cleaning Unit

There are cases in which the cleaning unit 60 malfunctions due to the spiral 52 and the engaging part 66 not reengaging properly upon the above-described transition from the second state to the third state. The malfunctioning is mainly caused by the engaging part 66 and the spiral 52 stopping in contact state, due to the engaging part 66 not fitting into the spiral recess groove 51G and the engaging part 66 riding on the spiral 52, for example. In such a case, the cleaning unit 60 becomes incapable of moving. The inventors of the present invention have found out that such failure is caused by the swinging of the cleaning unit 60 (the cylinder part 61). This failure is described by referring to a comparative example.

Figure 9A:
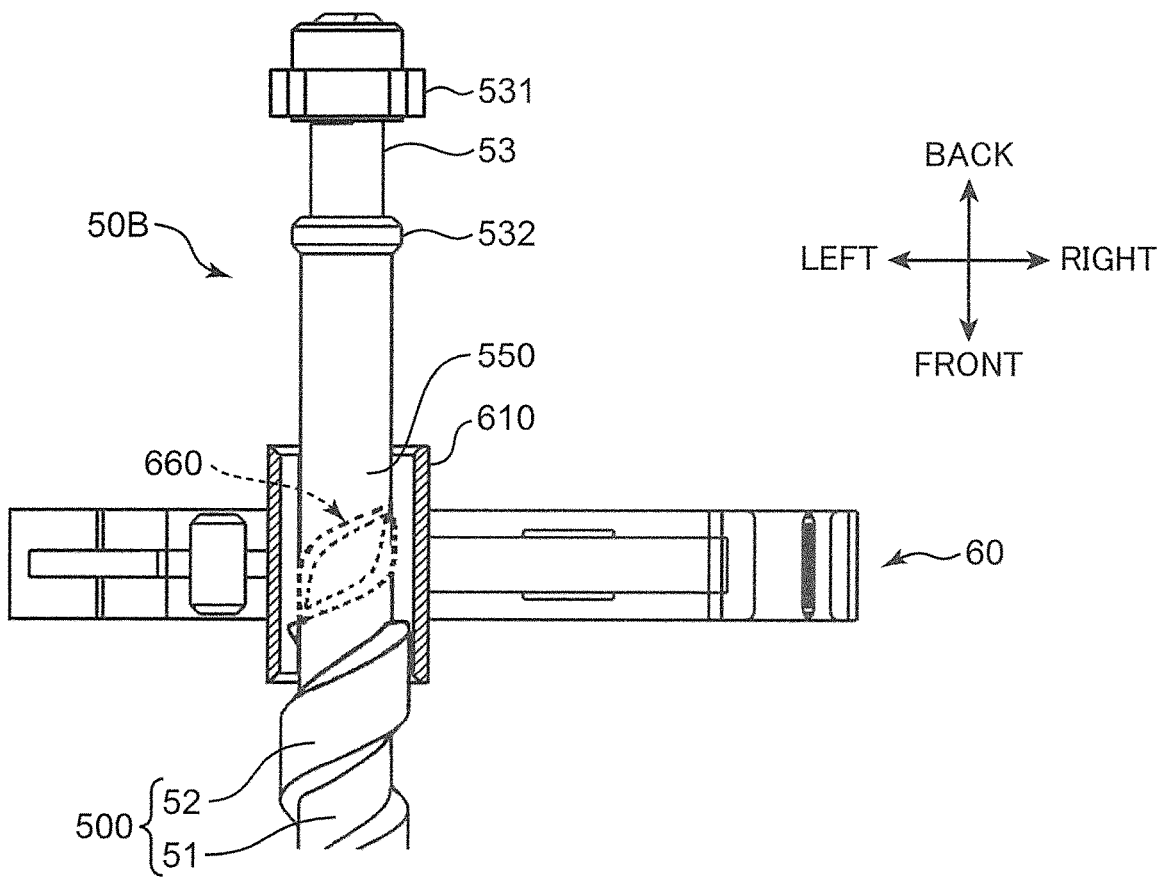
FIG. 9A is a partially-broken top view illustrating an engagement relationship between a rotation shaft and a cleaning unit in a second state in a comparative example.
Figure 9B:
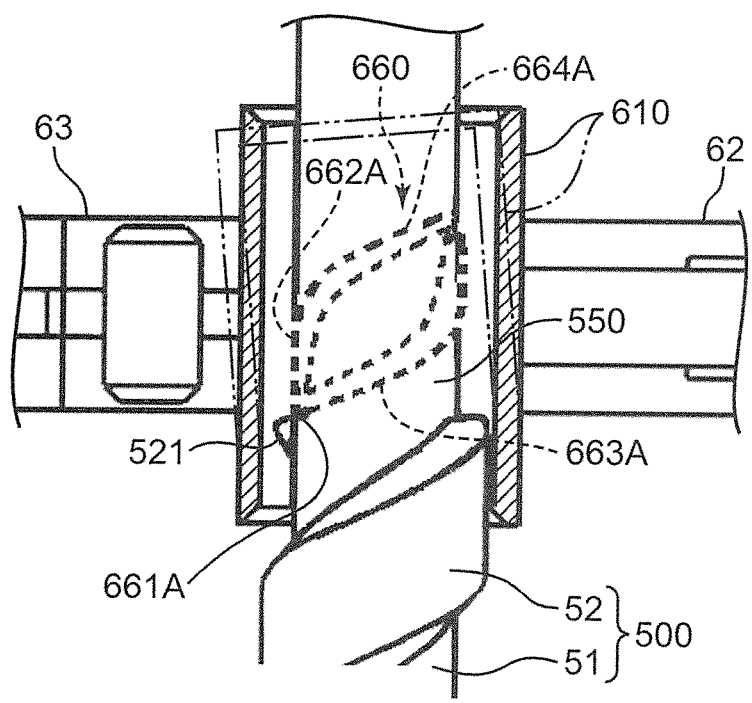
FIG. 9B is an enlarged view of a main part of FIG. 9A.

FIG. 9A is a partially-broken top view illustrating an engagement relationship between a cylinder part 610 of the cleaning unit 60 and a rotation shaft 500 according to the comparative example in the second state, and FIG. 9B is an enlarged view of a main part of FIG. 9A. In these drawings, only the cylinder part 610 is illustrated as a cross-section, and an engaging part 660 protruding radially inward from the inner circumferential surface of the cylinder part 610 is illustrated by using dotted lines.

The rotation shaft 500 has the shaft 51 and the spiral 52 and has a planar part 550, but does not have the column part 54 at the back end part 50B thereof. That is, the state of the planar part 550 corresponds to the planar part 55 of the rotation shaft 50 continuing from the back end part of the spiral 52 to the stopper ring 532. That is, the front-back direction length of the planar part 550 is considerably longer than the front-back direction length of the cylinder part 610.

Between the inner circumferential surface of the cylinder part 610 and the circumferential surface of the planar part 550 (the shaft 51), a gap corresponding to at least the radial-direction height of the spiral 52 is present. Due to this, when the cleaning unit 60 is in the second state, while the front end-side of the cylinder part 610 may be supported by the top surface of the spiral 52, there is no member supporting the back end-side of the cylinder part 610. Hence, as indicated by the imaginary lines in FIG. 9B, the cylinder part 610 is unfortunately in a state of being capable of swinging by an amount corresponding to the gap.

When the cylinder part 610 becomes unfortunately inclined with respect to the axial direction of the rotation shaft 50, the possibility of the reengagement of the engaging part 660 and the spiral 52 resulting in failure increases. For example, the cleaning unit 60 becomes incapable of moving because the engaging part 660 rides on the top surface of the spiral 52 and a state such that the engaging part 660 and the spiral 52 bite into one another occurs. In such a case, not only the malfunctioning problem of the cleaning unit 60 but also other failures would occur. Such other failures include damage to the engaging part 660 and the spiral 52 due to the engaging part 660 and the spiral 52 biting into one another as described above, and the application of excessive load onto the drive motor 70.

Figure 10A:
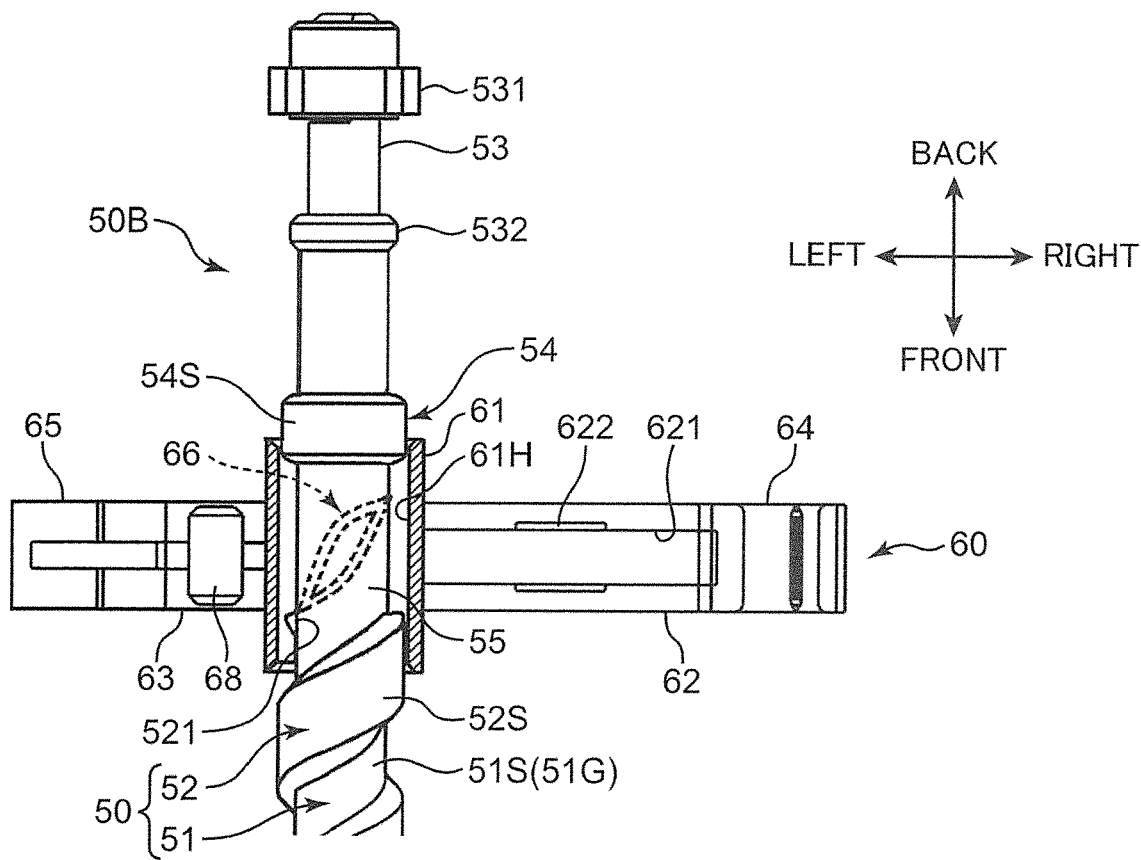
FIG. 10A is a partially-broken top view illustrating an engagement relationship between the rotation shaft and the cleaning unit in the second state in the present embodiment.
Figure 10B:
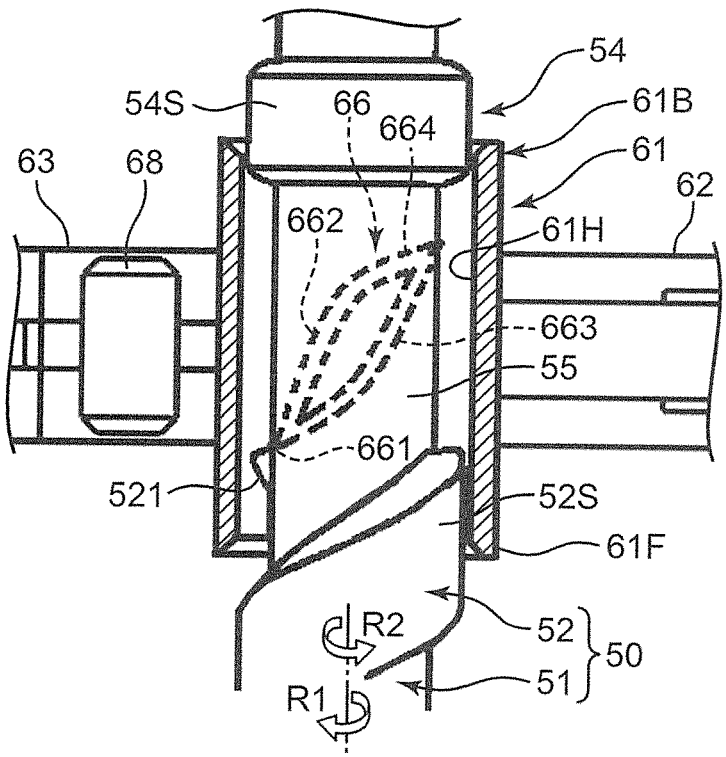
FIG. 10B is an enlarged view of a main part of FIG. 10A.

The present embodiment is capable of overcoming the failures of the comparative example. FIG. 10A is a partially-broken top view illustrating the engagement relationship between the cylinder part 61 of the cleaning unit 60 and the rotation shaft 50 according to the present embodiment in the second state, and FIG. 10B is an enlarged view of a main part of FIG. 10A. The rotation shaft 50 of the present embodiment has the column part 54 at the back end part 50B thereof, and the planar part 55 is present between the back end part of the spiral 52 and the column part 54. The front-back direction length of the planar part 55 is slightly shorter than the front-back direction length of the cylinder part 61.

The cylinder part 61 has, in the direction of the cylinder axis thereof, a back end part 61B (a first end part located at a side in the first movement direction) and a front end part 61F (a second end part located at a side in the second movement direction). In the second state, the back end part 61B of the cylinder part 61 fits onto the vicinity of the front end of the column part 54, and the front end part 61F of the cylinder part 61 radially faces the top surface 52S (the outer circumferential surface) near the back end part of the spiral 52. In short, the back end part 61B and the front end part 61F are respectively supported by the column part 54 and the spiral 52.

The structure necessary for realizing such form of support is as follows. First, the span of the planar part 55 at least needs to be long enough to release the engagement of the engaging part 66 with respect to the spiral 52 (if the engagement is not released, the cleaning unit 60 would keep being pushed toward the back direction F1). That is, the planar part 55 at least needs to have a front-back direction length long enough to take a position such that the engaging part 66 does not interfere with the back end edge of the spiral 52, or in other words a spiral leading end part 521 (spiral starting end part). The cylinder part 61 has the engaging part 66 at the cylinder axis-direction center thereof, and for stable movement over the spiral 52, there needs to be an appropriate length both in front of and behind the engaging part 66. The length from the engaging part 66 to the back end part 61B and the length from the engaging part 66 to the front end part 61F are set taking this point in consideration. The column part 54 is disposed to cover, in a state in which the engagement of the spiral 52 and the engaging part 66 is released (the second state), a position at which the back end part 61B, which has been set as described above, radially faces the shaft 51. Hence, it is possible to have the column part 54 and the back end part 61B radially overlap, as illustrated in FIG. 10B. Note that the back end part of the spiral 52 is also formed so that the front end part 61F and at least a part of the top surface 52S radially overlap.

As described up to this point, according to the present embodiment, the back end part 61B and the front end part 61F of the cylinder part 61 are supported by the column part 54 and the back end part of the spiral 52, which is a portion radially protruding from the circumferential surface 51S of the shaft 51, respectively. Hence, even in the second state in which the engaged state of the spiral 52 and the engaging part 66 is released, a state in which the cylinder part 61 is greatly inclined with respect to the axial direction of the rotation shaft 50 does not occur and a coaxial relationship between the rotation shaft 50 and the cylinder part 61 can be generally maintained. Accordingly, upon reengagement at the time of transition from the second state to the third state, the occurrence of a state in which the spiral 52 and the engaging part 66 bite into one another as described in the comparative example, etc., is suppressed and it is possible to have the spiral 52 and the engaging part 66 mesh with one another smoothly. That is, it is possible to allow the engaging part 66 to fit into the spiral recess groove 51G smoothly with assistance of the biasing force of the spring 69.

Further, the radial-direction protrusion height of the spiral 52 from the circumferential surface 51S and the radial-direction protrusion height of the column part 54 from the circumferential surface 51S are set equal. Due to this, it is possible to allow the back end part 61B and the front end part 61F of the cylinder part 61 to be held at the same height from the rotation shaft 50. Accordingly, the relationship between the rotation shaft 50 and the cylinder part 61 can be brought even closer to a coaxial relationship, and it is possible to make the spiral 52 and the engaging part 66 reengage more easily. Note that the column part 54 may have smaller radial-direction protrusion height than the spiral 52, as long as the column part 54 is capable of suppressing swinging of the cylinder part 61.

Shape of Engaging Part

Figure 11:
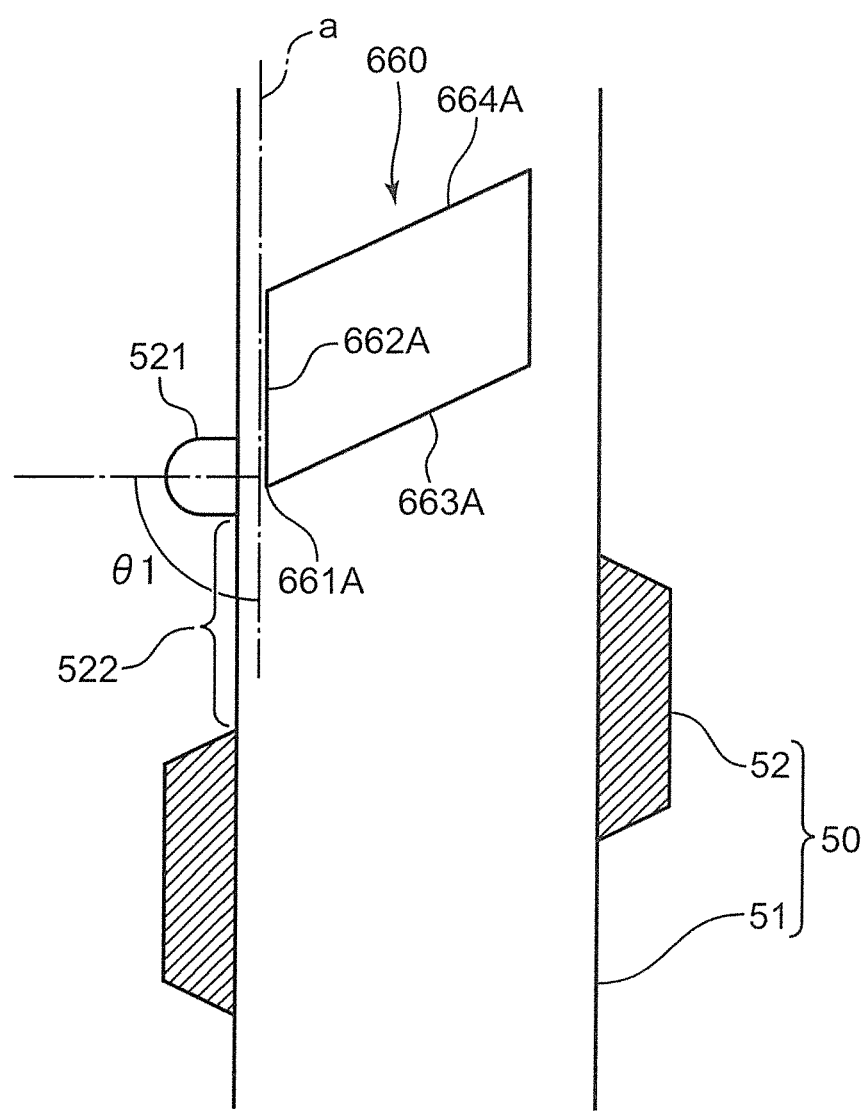
FIG. 11 is a schematic diagram for describing an angle of contact of an engaging part of the cleaning unit according to the comparative example with respect to a spiral leading end part.

In the present embodiment, a measure for facilitating the reengagement of the spiral 52 and the engaging part 66 is also taken with regards to the shape of the engaging part 66. First, description is provided of a comparative example. FIG. 11 is a schematic diagram for describing a contact angle θ1 of the engaging part 660 according to the comparative example previously illustrated in FIG. 9, with respect to the spiral leading end part 521.

The engaging part 660 includes: an engagement leading end part 661A; a left-side wall 662A and a front-side wall 663A that intersect at the engagement leading end part 661A; and a back-side wall 664A that opposes the front-side wall 663A. The engagement leading end part 661A is located farthest at the front end-side, and is the portion that interferes with the spiral leading end part 521 upon transition from the second state to the third state (when the rotation shaft 50 starts rotating in the counterclockwise direction R2). The left-side wall 662A is also a portion that interferes with the spiral leading end part 521 upon the transition. The front-side wall 663A and the back-side wall 664A are portions that come into sliding contact with the lateral walls of the spiral 52 when the engaging part 660 enters the engaged state in which the engaging part 660 fits into a spiral valley part 522 (the spiral recess groove 51G) between the spirals 52. That is, the front-side wall 663A and the back-side wall 664A are the portions receiving the propulsive force. Accordingly, the front-back direction length between the front-side wall 663A and the back-side wall 664A is slightly shorter than the width of the spiral valley part 522, and the front-side wall 663A and the back-side wall 664A have an inclination matching the spiral angle of the spiral 52.

Upon the transition from the second state to the third state, the engaging part 660 receiving the biasing force of the spring 69 needs to smoothly pass over the spiral leading end part 521 and fit into the spiral valley part 522. The reengagement is realized in such a manner. However, the left-side wall 662A is a wall generally following a line segment a that is parallel with the axial direction of the rotation shaft 50. Hence, the contact angle θ1 of the left-side wall 662A with respect to the spiral leading end part 521 is obtuse. Accordingly, when the rotation shaft 50 rotates and the spiral leading end part 521 abuts against the left-side wall 662A, the left-side wall 662A cannot release the abutting force, that is, the engaging part 660 cannot escape in the front-back direction, and the possibility of the engaging part 660 stopping in contact state due to the spiral leading end part 521 being jammed beneath the engaging part 660 increases.

Figure 12:
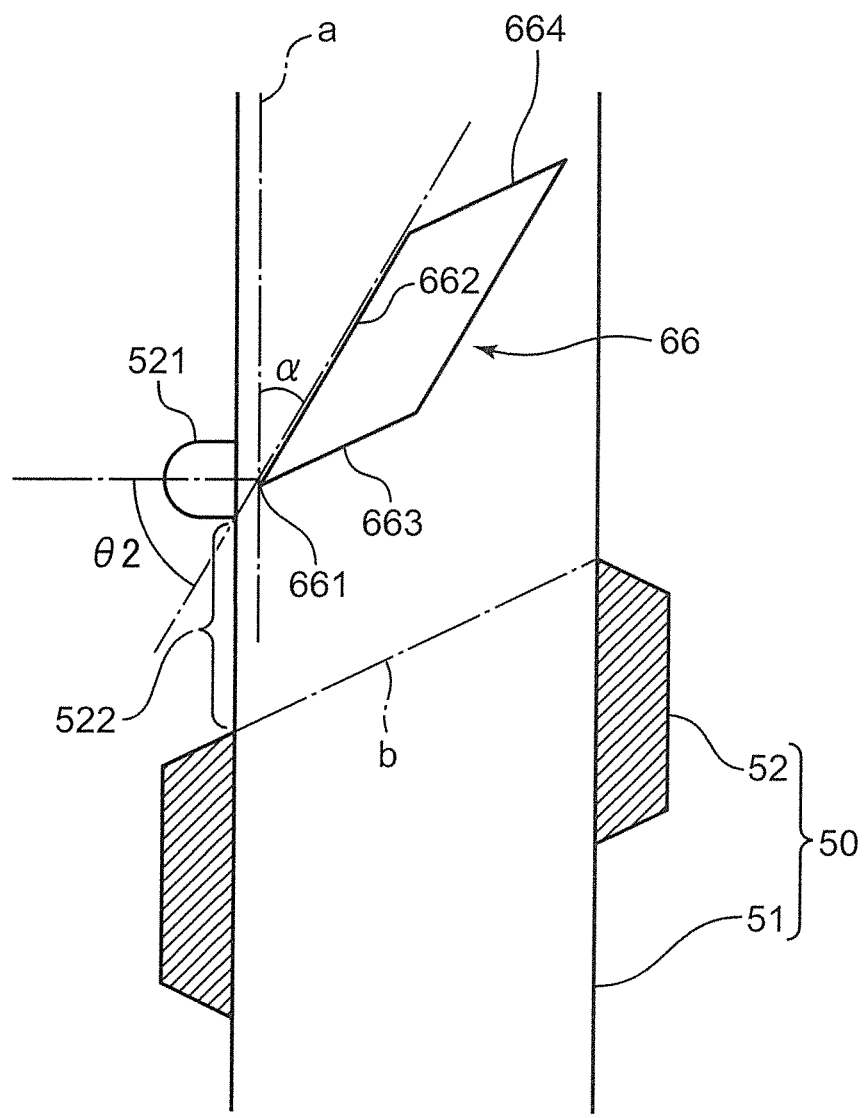
FIG. 12 is a schematic diagram for describing an angle of contact of an engaging part of the cleaning unit according to the present embodiment with respect to the spiral leading end part.

In contrast, FIG. 12 is a schematic diagram for describing a contact angle θ2 of the engaging part 66 according to the present embodiment, with respect to the spiral leading end part 521. Similarly to the comparative example, the engaging part 66 includes: an engagement leading end part 661; a left-side wall 662 (a lateral wall) and a front-side wall 663 that intersect at the engagement leading end part 661; and a back-side wall 664 that opposes the front-side wall 663. The engagement leading end part 661 is located farthest at the front end-side, and is a portion that interferes with the spiral leading end part 521 upon transition from the second state to the third state. The left-side wall 662 is also a portion that interferes with the spiral leading end part 521 upon the transition, and is a lateral wall that extends backward generally in the axial direction from the engagement leading end part 661. The front-side wall 663 and the back-side wall 664 are portions that come into sliding contact with the lateral walls of the spiral 52 and receive the propulsive force when the engaging part 66 enters the engaged state in which the engaging part 66 fits into the spiral valley part 522. The front-back direction length between the front-side wall 663 and the back-side wall 664 is slightly shorter than the width of the spiral valley part 522, and the front-side wall 663 and the back-side wall 664 have an inclination substantially matching a spiral angle b (a spiral direction) of the spiral 52.

The difference from the above-described comparative example is that the left-side wall 662 has a predetermined inclination angle α following (toward) the spiral direction of the spiral 52, with respect to the line segment a, which is parallel with the axial direction of the rotation shaft 50. Due to the left-side wall 662 having the inclination angle α, the contact angle θ2 of the left-side wall 662 with respect to the spiral leading end part 521 becomes more acute compared to the contact angle in the above-described comparative example. Hence, when the rotation shaft 50 rotates and the spiral leading end part 521 collides with the left-side wall 662, the engaging part 66 can escape more easily in the front-back direction. That is, the occurrence of the situation in which the spiral leading end part 521 is jammed beneath the engaging part 66 is suppressed.

Rather, the situation changes such that when the above-described collision occurs, the engaging part 66 fits into the spiral valley part 522 in a manner such that the engagement leading end part 661 and the left-side wall 662 are invited in by the spiral leading end part 521. That is, the engaging part 66 is more easily invited in by the spiral leading end part 521 and the reengagement is established smoothly, due to the contact angle θ2 becoming acute with the left-side wall 662 having the inclination angle α, and also due to the rotation shaft 50 and the cylinder part 61 being maintained in coaxial state by the presence of the column part 54. The inclination angle α can be set as appropriate, and can be selected from the range of around ten to forty degrees.

Preferable Spiral Leading End Part

Figure 13A:
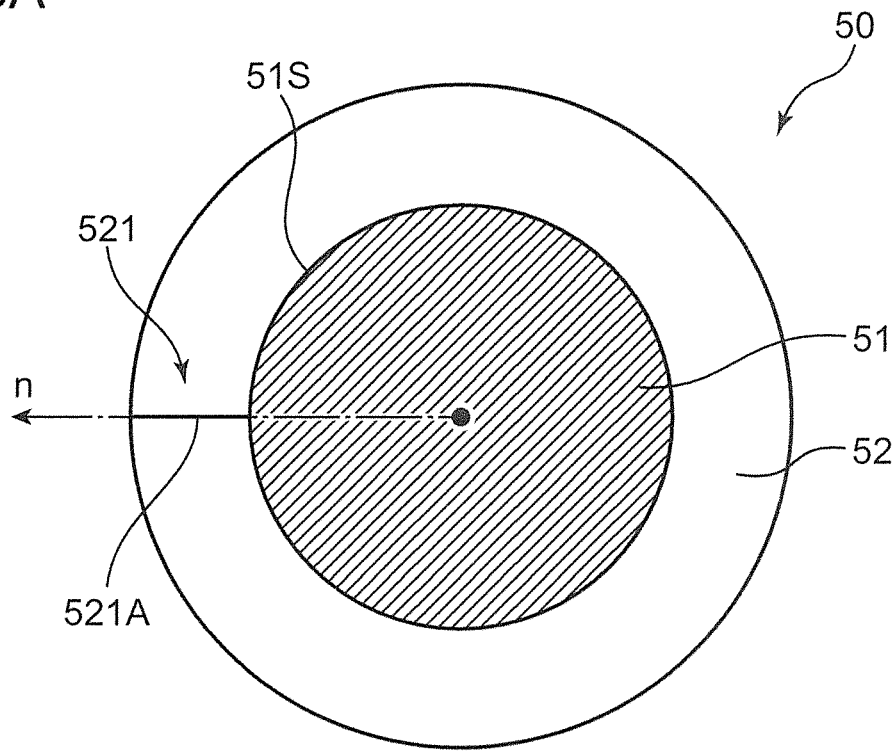
FIG. 13A is a cross-sectional view of a rotation shaft illustrating a preferable spiral leading end part.
Figure 13B:
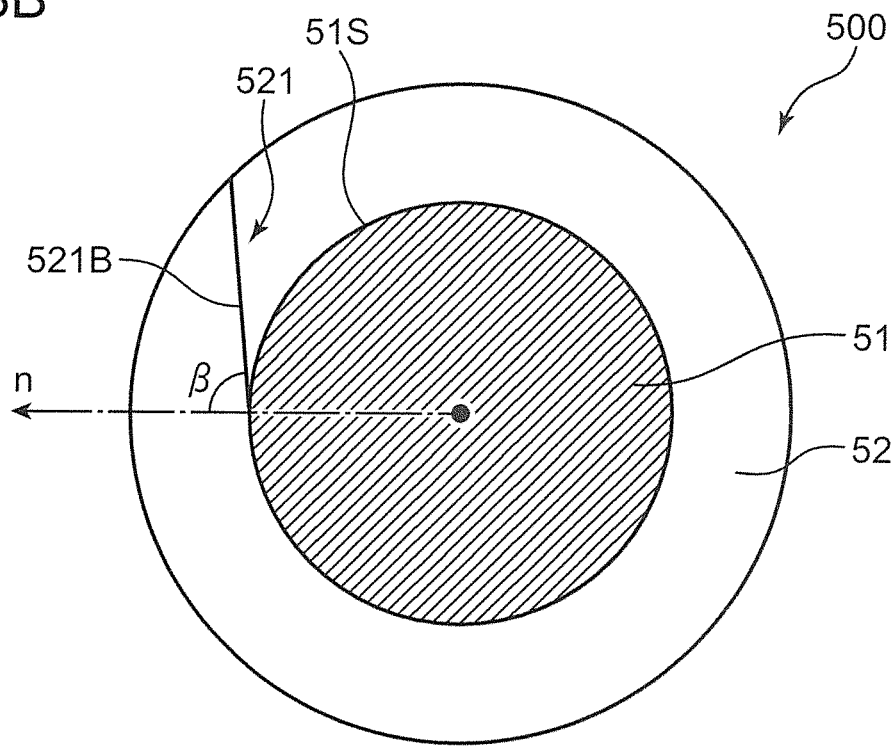
FIG. 13B is a cross-sectional view of a rotation shaft illustrating a common spiral leading end part.

FIG. 13A is a cross-sectional view of the rotation shaft 50 illustrating a preferable spiral leading end part 521, and FIG. 13B is a cross-sectional view of the rotation shaft 500 illustrating a common spiral leading end part 521. The spiral leading end part 521 illustrated in FIG. 13A is provided with a leading end surface 521A that rises in the direction of a normal line n of the circumferential surface 51S of the shaft 51. That is, the leading end surface 521A is a surface that rises steeply from the circumferential surface 51S.

In contrast, the spiral leading end part 521 illustrated in FIG. 13B is a leading end surface 521B that has an inclination angle β with respect to the normal line n of the circumferential surface 51S. The leading end surface 521B is a surface that rises gently with respect to the circumferential surface 51S. Generally, in the case of structures in which a spiral protrusion is formed on a shaft, a design such that a steep edge stands at a spiral leading end part is not made, and rather, a gentle inclination as represented by the leading end surface 521B is provided.

However, in the present embodiment, the spiral leading end part 521, which has a steep leading end surface only having a slight inclination with respect to the direction of the normal line n or the normal line n, as represented by the leading end surface 521A, is preferable. With the steep leading end surface 521A, the possibility of the left-side wall 662 of the engaging part 66 being pushed back when the left-side wall 662 abuts against the spiral leading end part 521 increases. That is, with the gently-rising standing leading end surface 521B, there is a tendency of the engaging part 66 and the spiral 52 stopping in contact state due to the left-side wall 662 being guided by the inclination of the leading end surface 521B and the engaging part 66 thus riding on top of the spiral 52.

However, with the steeply-rising leading end surface 521A, the possibility of the left-side wall 662 being guided onto the spiral 52 is low and rather, the left-side wall 662 resists against being guided in such a manner. Accordingly, even if the engaging part 66 fails to engage with the spiral 52 when the rotation shaft 50 makes its first rotation in the counterclockwise direction R2 upon the transition from the second state to the third state, the engagement leading end part 661 or the left-side wall 662 merely abuts against and is pushed back by the leading end surface 521A of the spiral leading end part 521. Due to this, the engaging part 66 and the spiral 52 can try engaging with one another once again in the second rotation in the counterclockwise direction R2.

Electrical Configuration

Figure 14:
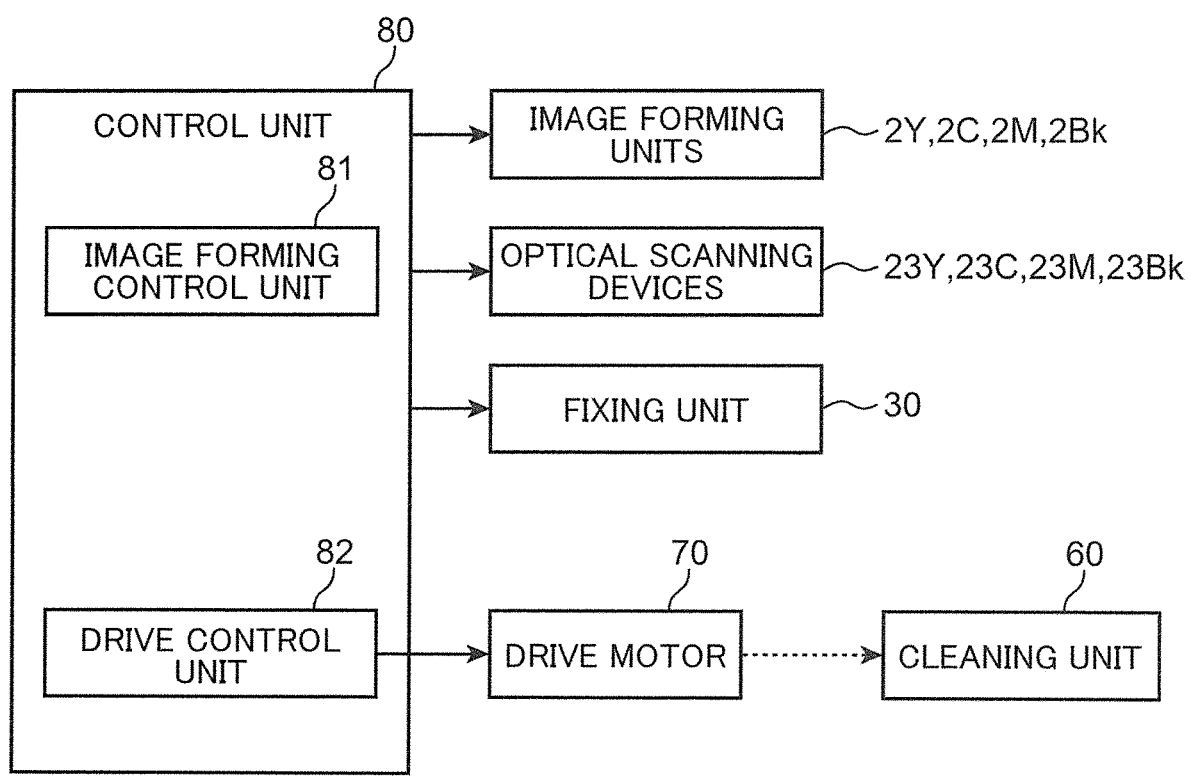
FIG. 14 is a block diagram illustrating an electrical configuration of the image forming apparatus.

FIG. 14 is a block diagram illustrating an electrical configuration of the image forming apparatus 1 according to the present embodiment. The image forming apparatus 1 is provided with a control unit 80 that integrally controls the operations of the respective components of the image forming apparatus 1. The control unit 80 includes an image forming control unit 81 and a drive control unit 82.

The image forming control unit 81 controls the image forming operation in the image forming apparatus 1. Specifically, the image forming control unit 81 controls the operations of the image forming units 2Y to 2Bk, the optical scanning devices 23Y to 23Bk, and the fixing unit 30 to control the forming of electrostatic latent images on the photoreceptor drums 21, the developing of the electrostatic latent images with toner, the primary transfer of toner images onto the primary transfer belt 281, the secondary transfer of a full color toner image from the transfer belt 281 onto a sheet, the fixing operation, etc.

The drive control unit 82 controls the operation of the drive motor 70 in order to have the cleaning unit 60 execute the cleaning operation of the window part 41. When not operated, the cleaning unit 60 is positioned at the home position (the position close to the front wall 40F of the housing 40). The drive control unit 82 has the drive motor 70 operate at a predetermined cleaning timing, such as when the image forming apparatus 1 is activated, after image forming has been performed for a predetermined number of sheets, or after a predetermined drive time has elapsed.

For example, the drive control unit 82 has the drive motor 70 forwardly rotate to cause the rotation shaft 50 to rotate in the clockwise direction R1 and has the drive motor 70 reversely rotate to cause the rotation shaft 50 to rotate in the counterclockwise direction R2. As the control logic, a method in which the time required for the cleaning unit 60 to move between the front wall 40F and the back wall 40B is grasped in advance and the time over which the drive motor 70 is to be driven in the forward and reverse directions is simply set as appropriate can be mentioned as an example. As a matter of course, a modification may be made such that the position of the cleaning unit 60 is sensed by using sensors and the drive motor 70 is switched between forward and reverse rotation.

As described up to this point, the present invention is capable of providing a movable body reciprocating mechanism using which reciprocation of a moving body such as the cleaning unit 60 can be executed with certainty, and a cleaning mechanism C in which this reciprocation mechanism is used. Further, by the cleaning mechanism C being applied to the optical scanning devices 23Y to 23Bk, it is possible to have the automatic cleaning of the window part 41 executed with certainty, and thus, optical scanning devices 23Y to 23Bk and an image forming apparatus 1 with which image degradation due to pollution of the window part 41 does not occur can be provided.

The above-described embodiment is one embodiment of the present invention and the present invention is not limited thereto. For example, the cleaning mechanism C is applied to clean the window part 41 of the optical scanning device 23Y in the above-described embodiment. The present invention, however, is not limited to this. For example, when a charging wire-type charger is being used as the charger 22, the cleaning mechanism C can be applied for the cleaning of the charging wire. Further, the cleaning mechanism C is applicable to various types of devices other than the image forming apparatus 1. Further, the present invention is applicable to various types of moving bodies that reciprocate, other than the cleaning mechanism C.

The invention claimed is:

1. A movable body reciprocating mechanism comprising:
a rotation shaft that has: a circumferential surface; and a spiral ridge part protruded on the circumferential surface and extending spirally in an axial direction, and that is rotatable in a first rotation direction and a second rotation direction opposite to the first rotation direction;
a drive source that causes the rotation shaft to rotate; and
a moving body that includes: a cylinder part through which the rotation shaft is inserted; and an engaging part protruded on an inner circumferential surface of the cylinder part and engaging with the spiral ridge part, and that reciprocates along the axial direction in an engaged state in which the engaging part is engaged with the spiral ridge part as the rotation shaft rotates,
wherein
a state of the moving body changes among: a first state in which the moving body is in the engaged state and moves in a first movement direction as the rotation shaft rotates in the first rotation direction; a second state in which the moving body releases the engaged state after moving in the first movement direction; and a third state in which, as the rotation shaft rotates in the second rotation direction, the engaging part reengages with the spiral ridge part to form the engaged state and the moving body moves in a second movement direction opposite to the first movement direction,
the rotation shaft has, successively disposed adjacent to an end part of the spiral ridge part at a side of the spiral ridge part in the first movement direction: a planar part composed of only the circumferential surface; and a cylindrical protrusion part that is protruded radially outward from the circumferential surface, and
the cylinder part of the moving body has: a first end part that is located at a side of the cylinder part in the first movement direction and fits onto the cylindrical protrusion part in the second state; and a second end part that is located at a side of the cylinder part in the second movement direction and radially faces an outer circumferential surface of the spiral ridge part in the second state;
the movable body reciprocating mechanism further comprising
a biasing member that biases the moving body toward the second movement direction when the moving body is in the second state, and that places the moving body in the third state by causing the engaging part to reengage with the spiral ridge part when the rotation shaft rotates in the second rotation direction,
wherein
the engaging part of the cylinder part includes: an engagement leading end part at a side of the engaging part in the second movement direction; and a lateral wall that extends along the axial direction toward the first movement direction from the engagement leading end part,
the reengagement is realized by the engagement leading end part and the lateral wall being invited in by a spiral starting end part at a side of the spiral ridge part in the first movement direction upon transition from the second state to the third state, and
the lateral wall has, with respect to the axial direction, a predetermined inclination toward a spiral direction of the spiral ridge part.

2. The movable body reciprocating mechanism according to claim 1, wherein a radial-direction protrusion height of the spiral ridge part from the circumferential surface and a radial direction protrusion height of the cylindrical protrusion part from the circumferential surface are equal.

3. The movable body reciprocating mechanism according to claim 1, wherein the spiral starting end part has a starting end surface that rises in a direction of a normal line of the circumferential surface.

4. A cleaning mechanism comprising:
a cleaning member that cleans an object to be cleaned; and
the movable body reciprocating mechanism according to claim 1,
wherein
the rotation shaft is disposed along the object to be cleaned, and
the moving body holds the cleaning member.

5. An optical scanning device comprising:
a housing that has a window part;
a scanning optical system that is disposed inside the housing and irradiates a predetermined scanning target object with scanning light through the window part; and
the cleaning mechanism according to claim 4,
wherein the object to be cleaned is the window part.

6. An image forming apparatus comprising:
an image carrier; and
the optical scanning device according to claim 5, the optical scanning device irradiating the image carrier with the scanning light based on image information.

* * * * *